Patented Mar. 30, 1954

2,673,862

UNITED STATES PATENT OFFICE 2,673,862

N-(DIALKYLAMINOALKYL)-β,β,β-TRIARYL-PROPIONAMIDE

Carl Peter Krimmel, Mundelein, Ill., assignor to G. D. Searle & Co., Chicago, Ill., a corporation of Illinois No Drawing. Application March 22, 1952, Serial No. 278,119

12 Claims. (Cl. 260—389)

The present invention pertains to a new group of amides of β,β,β-triarylpropionic acids and their salts. In particular, it relates to the amides of the structural formula

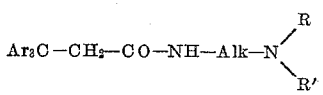

and the salts thereof, wherein the Ar radicals are lower aryl groups, Alk is a lower alkylene radical separating the two nitrogen atoms by at least two carbon atoms, and NRR' is a member of the class consisting of lower dialkylamino radicals and saturated nitrogen-containing heterocyclic radicals attached to the radical Alk through a nitrogen in the heterocycle.

In the foregoing structural formula the aryl radical Ar can represent phenyl and lower alkylated phenyl radicals such as tolyl, xylyl, cumyl, and tertiary butylphenyl radicals. The radical Alk represents a bivalent, saturated, aliphatic hydrocarbon radical of from 2 to 8 carbon atoms; this radical is derived from a straight-chain or branched-chain aliphatic hydrocarbon and includes radicals such as ethylene, propylene, butylene, amylene, or polymethylene radicals such as trimethylene, tetramethylene, pentamethylene, and hexamethylene. The radicals R and R' may represent such lower alkyl groups as methyl, ethyl, propyl, butyl, amyl, and hexyl, wherein the propyl, butyl, amyl and hexyl groups may be either of the straight-chain or branch-chain type. In addition the radical NRR' can also be a saturated nitrogen-containing heteromonocyclic group attached to the radical Alk through a nitrogen in the heterocycle; examples of suitable heterocyclic groups are N-pyrrolidino, N-piperidino, N-lupetidino, N-morpholino, N-thiamorpholino, N'-alkyl-N-piperazino and like radicals.

The organic bases of the foregoing type form salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

The object of this invention is to provide novel organic amides and their salts. The simple addition salts of these amides have been found to possess a number of valuable therapeutic properties, especially in improving cardiovascular function. It is of special interest that the claimed N-dialkylaminoalkyl-β,β,β-triarylpropionamides have been found to be active diuretics while the corresponding α,α,α-triphenylacetamides were found to be inactive.

My invention will appear more fully from the following examples which are set forth merely for the purpose of illustration, and are not to be construed as limiting the invention in spirit or in scope. It will be apparent to organic chemists that many modifications can be adopted without departing therefrom. In each of these examples temperatures are given uncorrected in degrees centigrade (°C.) and quantities in parts by weight.

EXAMPLE 1

N-(γ-dimethylaminopropyl)-β,β,β-triphenylpropionamide

A mixture of 40 parts of β,β,β-triphenylpropionic acid and 31 parts of thionyl chloride in 480 parts of carbon tetrachloride is refluxed on the steam bath for 3 hours. The excess of the volatile reagents is then removed by vacuum distillation on the steam bath and the yellow acid chloride syrup is used without further purification.

To a stirred solution of 42 parts of β,β,β-triphenylpropionyl chloride dissolved in 700 parts of anhydrous ethyl ether are added 13 parts of 3-dimethylamino-1-aminopropane by slow dropwise addition. The reaction mixture is extracted with dilute hydrochloric acid. The acid solution is separated, ether washed, and made alkaline with sodium hydroxide. The organic base separates as a pale yellow granular solid. After water washing, drying, and recrystallization from petroleum ether it is recovered as a white solid melting at 131–133° C.

To a stirred solution of 10 parts of N-(γ-dimethylaminopropyl) - β,β,β - triphenylpropionamide dissolved in 120 parts of butanone is added an equivalent of a 10% solution of hydrogen chloride in isopropanol. The precipitated hydrochloride is recrystallized from butanone and obtained as a white powder melting at 215–217° C. It has the structural formula

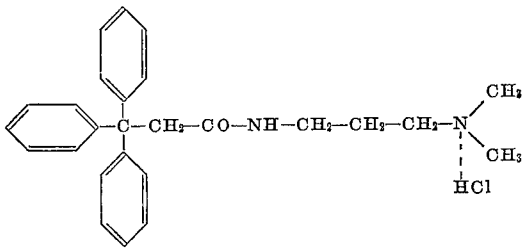

EXAMPLE 2

N-(β-diethylaminoethyl) -β,β,β-triphenylpropionamide

In the manner of Example 1, 42 parts of β,β,β-triphenylpropionyl chloride and 15 parts of 2-diethylaminoethylamine are caused to react. The N-(β-diethylaminoethyl) -β,β,β-triphenylpropionamide, after recrystallization from petroleum ether, is obtained as white needles, melting at about 132–136° C.

To a stirred solution of 10 parts of the base dissolved in 700 parts of anhydrous ethyl ether is added an equivalent of a 10% solution of hydrogen chloride in isopropanol. The precipitated hydrochloride is ether washed and dried in a vacuum desiccator. It consists of a white powder melting at 204.5–206.5° C. It has the structural formula

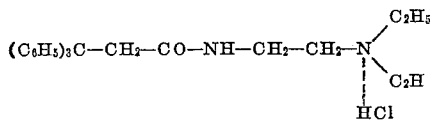

EXAMPLE 3

N-(δ - diethylaminobutyl) - β,β,β - triphenylpropionamide

To a stirred solution of 64 parts of β,β,β-triphenylpropionyl chloride dissolved in 700 parts of anhydrous ethyl ether are added 29 parts of 4-diethylamino - 1-aminobutane by rapid dropwise addition. The reaction mixture is extracted with 500 parts of water, and the water layer is separated, ether washed, and made alkaline with potassium hydroxide. The organic base is released as an oil which quickly solidifies to a crystalline mush. This is suction filtered, water washed, and dried in the steam cabinet. After two recrystallizations from anhydrous ethyl ether the N-(δ - diethylaminobutyl) - β,β,β - triphenylpropionamide is recovered as a white powder melting at 112–114° C.

To a stirred solution of 15 parts of the above base dissolved in 700 parts of anhydrous ethyl ether an equivalent of a 25% solution of hydrogen chloride in isopropanol is added. A gum is formed. The ether is decanted and replaced with a minimum of hot butanone. On recrystallization from butanone the hydrochloride is obtained as a white crystalline powder melting at 171–173° C. It has the structural formula

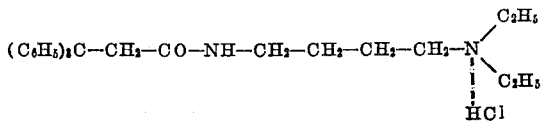

EXAMPLE 4

N-(γ-diethylamino - α-methylbutyl) - β,β,β-triphenylpropionamide

To a stirred solution of 64 parts of β,β,β-triphenylpropionyl chloride dissolved in 700 parts of anhydrous ethyl ether are added 32 parts of 5-diethylamino-2-aminopentane by rapid dropwise addition. The reaction mixture is extracted with 500 parts of water and the water extract is ether washed and made alkaline with potassium hydroxide. The released organic base is ether extracted, dried over potassium carbonate, and filtered. Evaporation of the ether on the steam bath causes the N-(γ - diethylamino-α-methylbutyl) -β,β,β-triphenylpropionamide to solidify as rosettes of needle-like crystals. Recrystallization from petroleum ether yields a white crystalline powder melting at 114–116° C.

To a stirred solution of 15 parts of the above base dissolved in 700 parts of anhydrous ethyl ether an equivalent of a 25% solution of hydrogen chloride in isopropanol is added. The precipitated hydrochloride is filtered, evaporated, dried in a vacuum desiccator and recrystallized from butanone to give a white powder melting at 157–159.5° C. It has the structural formula

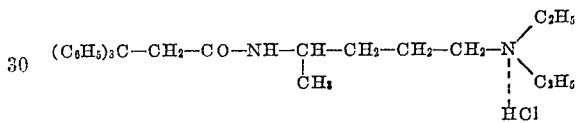

I claim:

1. The group of new organic compounds consisting of the amides of the structural formula $$Ar_3C—CH_2—CO—NH—Alk—NRR'$$

and the salts thereof, wherein Ar is an aryl radical containing 6 to 10 carbon atoms, Alk is a lower alkylene radical separating the two nitrogen atoms by at least two carbon atoms, and R and R' are lower alkyl radicals.

2. The lower N-dialkylaminoalkyl-β,β,β - triphenylpropionamides of the structural formula $$(C_6H_5)_3C—CH_2—CO—NH—Alk—N(\text{lower alkyl})_2$$

wherein Alk is a lower alkylene radical separating the two nitrogen atoms by at least two carbon atoms.

3. The N - dimethylaminoalkyl - β,β,β - triphenylpropionamides wherein the two nitrogen atoms are separated by a lower alkylene radical of at least two carbon atoms.

4. $(C_6H_5)_3C—CH_2—CO—NH—C_3H_6—N(CH_3)_2$.

5. The N - diethylaminoalkyl-β,β,β - triphenylpropionamides wherein the two nitrogen atoms are separated by a lower alkylene radical of at least two carbon atoms.

6. $(C_6H_5)_3C—CH_2—CO—C_2H_4—N(C_2H_5)_2$.

7. $(C_6H_5)_3C—CH_2—CO—NH—C_4H_8—N(C_2H_5)_2$.

8. 

9. The acid addition salts of the lower N-dialkylaminoalkyl - β,β,β - triphenylpropionamides of the structural formula $$(C_6H_5)_3C—CH_2—CO—NH—Alk—N(\text{lower alkyl})_2$$

wherein Alk is a lower alkylene radical separating the two nitrogen atoms by at least two carbon atoms.

10. The lower N-dialkylaminoalkyl-β,β,β - triphenylpropionamide hydrochlorides of the structural formula

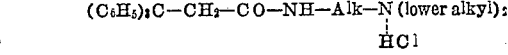

wherein Alk is a lower alkylene radical separating the two nitrogen atoms by at least two carbon atoms.

11. The hydrochlorides of the N-diethylamino-alkyl-$\beta,\beta,\beta$-triphenylpropionamides wherein the two nitrogen atoms are separated by a lower alkylene radical of at least two carbon atoms.

12. $(C_6H_5)_3C-CH_2-CO-NH-C_2H_4-N(C_2H_5)_2$
   $\quad\quad\quad\quad\quad\quad\quad\quad\quad\quad\quad\quad\quad\quad\quad\quad\quad$ HCl

CARL PETER KRIMMEL.

References Cited in the file of this patent
UNITED STATES PATENTS

| Number | Name | Date |
|---|---|---|
| 2,009,144 | Miescher et al. | July 23, 1935 |